(12) United States Patent
Goodsitt et al.

(10) Patent No.: US 12,361,332 B2
(45) Date of Patent: Jul. 15, 2025

(54) SYSTEMS AND METHODS FOR FEDERATED LEARNING OPTIMIZATION VIA CLUSTER FEEDBACK

(71) Applicant: Capital One Services, LLC, McLean, VA (US)

(72) Inventors: Jeremy Goodsitt, Champaign, IL (US); Christopher Wallace, San Francisco, CA (US); Grant Eden, San Francisco, CA (US); Anh Truong, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 890 days.

(21) Appl. No.: 17/457,996

(22) Filed: Dec. 7, 2021

(65) Prior Publication Data
US 2023/0177402 A1    Jun. 8, 2023

(51) Int. Cl.
  *G06N 20/00* (2019.01)
  *G06N 20/20* (2019.01)
(52) U.S. Cl.
  CPC .................................. *G06N 20/20* (2019.01)
(58) Field of Classification Search
  CPC ....................................................... G06N 20/20
  See application file for complete search history.

(56) References Cited

U.S. PATENT DOCUMENTS

| | | | | |
|---|---|---|---|---|
| 11,436,527 B2 * | 9/2022 | Pezzillo | ................ | H04L 67/10 |
| 11,443,245 B1 * | 9/2022 | Du | ................ | G06N 20/00 |
| 12,229,280 B2 * | 2/2025 | Ding | ................ | G06N 3/08 |
| 2019/0220703 A1 | 7/2019 | Prakash et al. | | |
| 2019/0325350 A1 * | 10/2019 | Desai | ................ | G06F 18/256 |
| 2019/0340534 A1 * | 11/2019 | McMahan | ................ | H04L 67/01 |
| 2020/0285980 A1 * | 9/2020 | Sharad | ................ | G06N 20/20 |

(Continued)

FOREIGN PATENT DOCUMENTS

| WO | 2021115480 A1 | 6/2021 | |
|---|---|---|---|
| WO | WO-2021249648 A1 * | 12/2021 | ............. G06N 3/045 |

OTHER PUBLICATIONS

Sattler et al. Clustered Federated Learning: Model-Agnostic Distributed Multi-Task Optimization under Privacy Constraints, 16 pages, arXiv:1910.01991v1 Oct. 4, 2019 (Year: 2019).*

*Primary Examiner* — Barbara M Level
(74) *Attorney, Agent, or Firm* — Bookoff McAndrews, PLLC

(57) ABSTRACT

A method for generating a cluster-based machine learning model based on federated learning with cluster feedback includes providing a current machine learning model to a plurality of user devices that train the current machine learning model, receiving respective model states, generating updated model states, causing the plurality of user devices to obtain a respective instance of an updated machine learning model based on the updated model states, receiving an applicability feedback for the updated machine learning model for each of the plurality of user devices, determining a plurality of user clusters including a subset of the plurality of user devices, identifying a first user cluster and a second user cluster, the first user cluster having a higher cluster applicability feedback than the second user cluster, receiving the additional model states from the clusters and updating the updated machine learning model to generate the cluster-based machine learning model.

20 Claims, 6 Drawing Sheets

(56) References Cited

U.S. PATENT DOCUMENTS

| | | |
|---|---|---|
| 2021/0073678 A1 | 3/2021 | Chu et al. |
| 2021/0406782 A1* | 12/2021 | Nakayama ............. G06N 20/20 |
| 2022/0076169 A1* | 3/2022 | Wang ....................... G06N 3/08 |
| 2023/0259744 A1* | 8/2023 | Moradi ................... G06N 3/08 |
| | | 706/28 |

* cited by examiner

SYSTEMS AND METHODS FOR FEDERATED LEARNING OPTIMIZATION VIA CLUSTER FEEDBACK

TECHNICAL FIELD

Various embodiments of the present disclosure relate generally to machine learning models, and more particularly, systems and methods for applying cluster feedback to federated learning.

BACKGROUND

Machine learning models often rely on user information to train and/or function, in order to provide outputs that are valuable to one or more users. However, openly sharing certain user information can be a security risk. It is often preferred that certain user information not be transmitted to one or more entities (e.g., that such user information remain with the user or user device). Accordingly, machine learning training based on such secure user information cannot be obtained due to the associated security risks. Additionally, machine learning models can often favor users with one or more metadata features. It may be beneficial to identify such features as well as to train respective machine learning models to deemphasize the one or more metadata features or to train the respective machine learning models by emphasizing users without the one or more metadata features.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for training a federated machine learning model using cluster-based feedback.

In one aspect, an exemplary embodiment of a method for generating a cluster-based machine learning model based on federated learning with cluster feedback may include: providing a current machine learning model to a plurality of user devices, the user devices each comprising respective secure user data; causing each of the plurality of user devices to separately train the current machine learning model using the respective secure user data; receiving respective model states generated by each of the plurality of user devices via the separate training; generating updated model states based on a combination of the respective model states from the plurality of user devices; causing the plurality of user devices or a plurality of simulated user devices generated based on the plurality of user devices to each obtain a respective instance of an updated machine learning model based on the updated model states; receiving an applicability feedback for the updated machine learning model for each of the plurality of user devices or each of the plurality of simulated user devices; determining a plurality of user clusters, each user cluster of the plurality of user clusters including a subset of the plurality of user devices or a subset of the plurality of simulated user devices; identifying a first user cluster and a second user cluster, the first user cluster including a first subset of the plurality of user devices or simulated user devices and having a higher cluster applicability feedback than the second user cluster including a second subset of the plurality of user devices or plurality of simulated user devices; causing the first subset and the second subset of the plurality of user devices or simulated user devices to generate additional model states; receiving the additional model states from the first cluster and the second cluster; and updating the updated machine learning model to generate the cluster-based machine learning model by applying a positive bias to the additional model states from the second cluster and applying a negative bias to the additional model states from the first cluster.

A system including a data storage device storing processor-readable instructions and a processor operatively connected to the data storage device and configured to execute the instructions to perform operations may include: providing a current machine learning model to a plurality of user devices, the user devices each comprising respective secure user data; causing each of the plurality of user devices to separately train the current machine learning model using the respective secure user data; receiving respective model states generated by each of the plurality of user devices via the separate training; generating updated model states based on a combination of the respective model states from the plurality of user devices; causing the plurality of user devices or a plurality of simulated user devices generated based on the plurality of user devices to each obtain a respective instance of an updated machine learning model based on the updated model states; receiving an applicability feedback for the updated machine learning model for each of the plurality of user devices or each of the plurality of simulated user devices; determining a plurality of user clusters, each user cluster of the plurality of user clusters including a subset of the plurality of user devices or a subset of the plurality of simulated user devices; identifying a first user cluster and a second user cluster, the first user cluster including a first subset of the plurality of user devices or simulated user devices and having a higher cluster applicability feedback than the second user cluster including a second subset of the plurality of user devices or plurality of simulated user devices; causing the first subset and the second subset of the plurality of user devices or simulated user devices to generate additional model states; receiving the additional model states from the first cluster and the second cluster; and updating the updated machine learning model to generate the cluster-based machine learning model by applying a positive bias to the additional model states from the second cluster and applying a negative bias to the additional model states from the first cluster.

In another aspect, an exemplary embodiment of a method for generating a cluster-based machine learning model based on federated learning with cluster feedback may include: generating a current machine learning model configured to output a task output; providing the current machine learning model to a plurality of user devices, the user devices each comprising secure user data; causing each of the plurality of user devices to separately train the current machine learning model using the respective secure user data; receiving respective model states generated by each of the plurality of user devices via the separate training; normalizing the model states from each of the plurality of user devices to generate updated model states; updating the current machine learning model with the updated model states to generate an updated machine learning model; providing the updated machine learning model to the plurality of user devices or a plurality of simulated user devices generated based on the plurality of user devices; receiving an applicability feedback for the updated machine learning model from each of the plurality of user devices or each of the plurality of simulated user devices; determining a plurality of user clusters, each user cluster of the plurality of user clusters including a subset of the plurality of user devices or a subset of the plurality of simulated user devices, wherein the plurality of clusters are determined based on user metadata associated with each of the plurality of user devices or based on each of the plurality of simulated user devices; identifying a first user cluster and a second user cluster, the first user cluster comprising a first subset of the plurality of user devices or simulated user devices and having a higher cluster applicability feedback than the second user cluster comprising a second subset of the plurality of user devices or simulated user devices; causing the first subset and the second subset of the plurality of user devices or simulated user devices to generate additional model states by further training the updated machine learning model; receiving the additional model states from the first cluster and the second cluster; and updating the updated machine learning model to generate the cluster-based machine learning model by applying a positive bias to the additional model states from the second cluster and applying a negative bias to the additional model states from the first cluster; and iteratively performing steps a-e until a model score meets or exceeds a threshold model score, steps a-e comprising: a) providing the cluster-based machine learning model to the plurality of user devices or simulated user devices in the first cluster and the plurality of user devices or simulated user devices in the second cluster; b) receiving updated applicability feedback for the cluster-based machine learning model from each of the plurality of user devices or each of the plurality of simulated user devices in the first cluster and the second cluster; c) determining updated cluster applicability feedback for the first cluster and for the second cluster based on the updated applicability feedback from the plurality of user devices or each of the plurality of simulated user devices in the first cluster and the second cluster; d) determining a model score based on the updated cluster applicability feedback for the first cluster and for the second cluster; and e) when the model score is below the threshold model score: causing the first subset and the second subset of the plurality of user devices or simulated user devices to generate additional model states by further training the cluster-based machine learning model; receiving the additional model states from the first cluster and the second cluster; and updating the cluster-based machine learning model by applying a positive bias to the additional model states from the second cluster and applying a negative bias to the additional model states from the first cluster.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
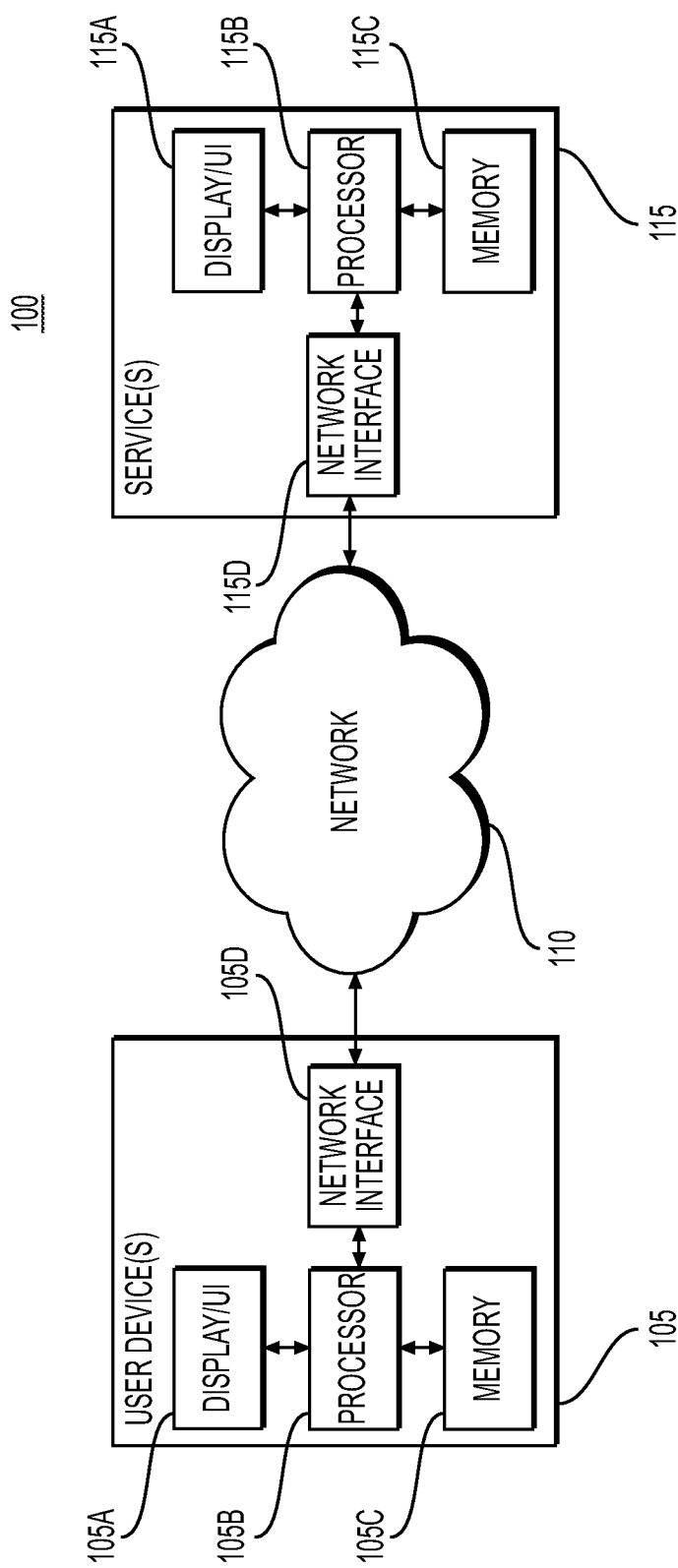
FIG. 1 depicts an exemplary environment for training a federated machine learning model using cluster-based feedback, according to one or more embodiments.

According to certain aspects of the disclosure, methods and systems are disclosed for training a federated machine learning model using cluster feedback. A federated machine learning model may be implemented by receiving decentralized training from a plurality of components (e.g., user devices). However, conventional techniques may not be suitable for normalizing the response(s) to the model across multiple groups of users. For example, conventional techniques may result in a federated machine learning model that is configured to output results that are applicable to a subset of the plurality of users that the model is applied to while other subsets of the plurality of users receive outputs that are not as applicable to those users. Accordingly, improvements in technology relating to cluster based training of federated machine learning models are needed.

As will be discussed in more detail below, in various embodiments, systems and methods are described for using federated machine learning and cluster based feedback to train a model for a larger plurality of users in a given set of users. By training a machine learning model, e.g., via supervised or semi-supervised learning, to learn associations between training data and ground truth data and further biasing based on cluster feedback, the trained machine learning models may be usable to perform tasks for a larger plurality of users.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

While several of the examples herein involve federated machine learning, it should be understood that techniques according to this disclosure may be adapted to any suitable type of machine learning. It should also be understood that the examples above are illustrative only. The techniques and technologies of this disclosure may be adapted to any suitable activity.

Presented below are various aspects of machine learning techniques that may be adapted to train a federated machine learning model using cluster-based feedback. As will be discussed in more detail below, machine learning techniques adapted to apply cluster-based feedback, may include one or more aspects according to this disclosure, e.g., a particular selection of training data, a particular training process for the machine learning model, operation of a particular device suitable for use with the trained machine learning model, operation of the machine learning model in conjunction with particular data, modification of such particular data by the machine learning model, etc., and/or other aspects that may be apparent to one of ordinary skill in the art based on this disclosure.

FIG. 1 depicts an exemplary system 100 for federated learning based on cluster feedback, according to one or more embodiments, and which may be used with the techniques presented herein. The system 100 may include one or more user device(s) 105 (hereinafter "user device 105" for ease of reference), a network 110, one or more server(s) 115 (hereinafter "server 115" for ease of reference). While only one of each of user device 105 and server 115 are depicted, the disclosure is not limited to one of each and two or more of each of user device 105 and server 115 may be implemented in accordance with the techniques disclosed herein.

The user device 105 and the server 115 may be connected via the network 110, using one or more standard communication protocols. The network 110 may be one or a combination of the Internet, a local network, a private network, or other network. The user device 105 and the server 115 may transmit and receive messages from each other across the network 110, as discussed in more detail below.

The server 115 may include a display/UI 115A, a processor 115B, a memory 115C, and/or a network interface 115D. The server 115 may be a computer, system of computers (e.g., rack server(s)), or a cloud service computer system. The server 115 may execute, by the processor 115B, an operating system (O/S). The memory 115C may also store one or more instances of a machine learning model (e.g. a current machine leaning model, updated machine learning model, cluster-based machine learning model, simulation machine learning model, etc.) as well as one or more model states. The display/UI 115A may be a touch screen or a display with other input systems (e.g., mouse, keyboard, etc.) for an operator of the server 115 to control the functions of the server 115. The network interface 115D may be a TCP/IP network interface for, e.g., Ethernet or wireless communications with the network 110.

The user device 105 may include a display/UI 105A, a processor 105б, a memory 105C, and/or a network interface 105D. The user device 105 may be a mobile device, such as a cell phone, a tablet, etc. The user device 105 may execute, by the processor 105б, an operating system (OS), a machine learning training component, an applicability feedback and/or level of success determination component, or the like. One or more components shown in FIG. 1 may generate or may cause to be generated one or more graphic user interfaces (GUIs) based on instructions/information stored in the memory 105C, instructions/information received from the server 115, and/or the one or more user devices 105. The GUIs may be mobile application interfaces or browser user interfaces, for example.

In various embodiments, the network 110 may be a wide area network ("WAN"), a local area network ("LAN"), personal area network ("PAN"), or the like. In some embodiments, electronic network 110 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the one or more components of exemplary system 100 may one or more of (i) generate, store, train, or use a machine learning model or its applicable components or attributes such as notes, model states, or the like. The exemplary system 100 or one of its components may include a machine learning model and/or instructions associated with the machine learning model, e.g., instructions for generating a machine learning model, training the machine learning model, using the machine learning model, etc. The exemplary system 100 or one of its components may include instructions for retrieving data, adjusting data, e.g., based on the output of the machine learning model, and/or operating a display to output data, e.g., as adjusted based on the machine learning model. The exemplary system 100 or one of its components may include, provide, and/or generate training data.

In some embodiments, a system or device other than the components shown in exemplary system 100 may be used to generate and/or train the machine learning model. For example, such a system may include instructions for generating the machine learning model, the training data and ground truth, and/or instructions for training the machine learning model. A resulting trained machine learning model may then be provided to exemplary system 100 or one of its components. The machine learning model may be stored in any applicable location such as in memory 115C or memory 105C, in a location other than system 100 in operable communication with system 100, or the like.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Alternatively or in addition, unsupervised learning and/or semi-supervised learning may be used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., compare the output of the trained model with the ground truth for that portion of the training data to evaluate an accuracy of the trained model. The training of the machine learning model may be configured to cause the machine learning model to learn associations between training data (e.g., secure user data) and ground truth data, such that the trained machine learning model is configured to determine an output in response to the input data based on the learned associations.

In various embodiments, the variables of a machine learning model may be interrelated in any suitable arrangement in order to generate the output. For example, in some embodiments, the machine learning model may include image-processing architecture that is configured to identify, isolate, and/or extract features, geometry, and or structure. For example, the machine learning model may include one or more convolutional neural networks ("CNN") configured to identify features in the data, and may include further architecture, e.g., a connected layer, neural network, etc., configured to determine a relationship between the identified features in order to determine a location in the data.

In some instances, different samples of training data and/or input data may not be independent. Thus, in some embodiments, the machine learning model may be configured to account for and/or determine relationships between multiple samples.

Figure 2:
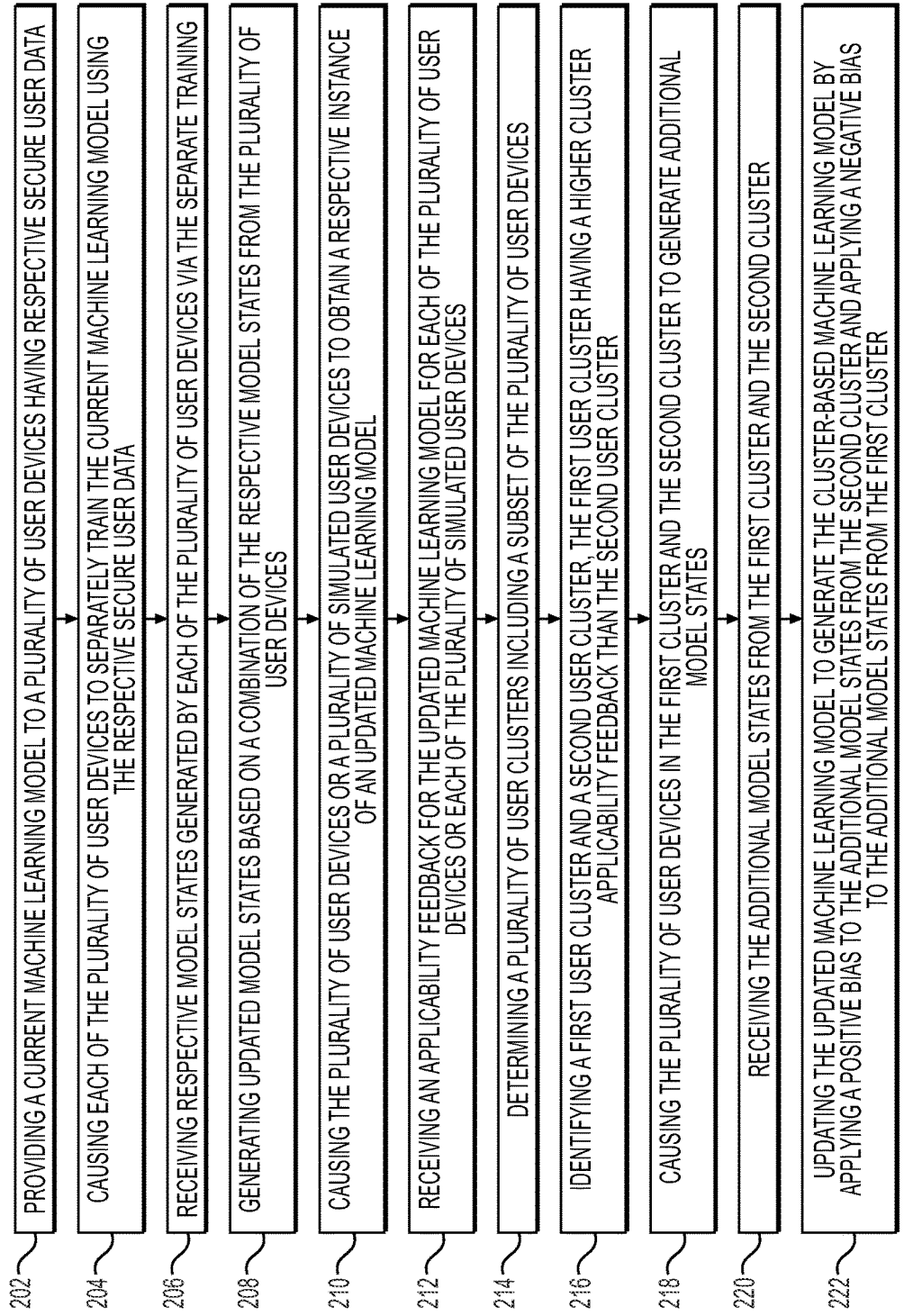
FIG. 2 depicts a flowchart of an exemplary method of training a federated machine learning model using cluster-based feedback, according to one or more embodiments.

For example, in some embodiments, the machine learning models described in FIG. 2 may include a CNN, Recurrent Neural Network ("RNN"). Generally, RNNs are a class of feed-forward neural networks that may be well adapted to processing a sequence of inputs. In some embodiments, the machine learning model may include a Long Shor Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of non-optical in vivo images as input, and generate a sequence of locations.

Although depicted as separate components in FIG. 1, it should be understood that a component or portion of a component in the exemplary system 100 may, in some embodiments, be integrated with or incorporated into one or more other components. For example, a portion of the display 105A may be integrated into the user device 105 or the like. In another example, the server 115 may be integrated in a data storage system. In some embodiments, operations or aspects of one or more of the components discussed above may be distributed amongst one or more other components. Any suitable arrangement and/or integration of the various systems and devices of the exemplary system 100 may be used.

Further aspects of the machine learning model and/or how it may be utilized to optimize a federated model based on cluster-based feedback are discussed in further detail in the methods below. In the following methods, various acts may be described as performed or executed by a component from FIG. 1, such as the server 115, the user device 105, or components thereof. However, it should be understood that in various embodiments, various components of the exemplary system 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

As applied herein, one or more model states may correspond to weights, layer configurations, variables, or the like that can be used with a machine learning model. A model state may be a numerical value or may be a relationship that can be used by a machine learning model to generate an output.

As shown in flowchart 200 of FIG. 2, a current machine learning model may be provided to a plurality of user devices 105 at 202, each of the plurality of user devices 105 including respective secure user data. The current machine learning model may be generated by server 115 for a given task such that the output of a trained version of the current machine learning model corresponds to a performance of that given task. Alternatively, the current machine learning model may be generated by a component or entity other than the server 115 and may be provided to the server 115 (e.g., via network 110). The current machine learning model may be generated at server 115 based on the receipt of or the generation of the given task. The given task may be generated by a user, an entity, processor 115B, or a combination of the same.

The current machine learning model may include a plurality of nodes that each are populated with a model state based on training, as further discussed herein. The current machine learning model may be initiated with placeholder model states which may be randomized model states (e.g., generated using a randomizer), null states, or singular states (e.g., each node for a given model state may have the same value). According to an implementation, the current machine learning model may be initiated with no model states such that training may be required to populate the model states.

The current machine learning model may be any applicable machine learning model disclosed herein. For example, the current machine learning model may be a supervised, unsupervised, semi-supervised, reinforcement, self-supervised, inductive, deductive, transductive, multi-task, active, online, transfer, ensemble, linear regression, logistic regression, decision tree, support vector machine (SVM), naive bayes, k-nearest neighbors (kNN), k-means, random forest, dimensionality reduction, gradient boosting, or the like, or a combination thereof, model.

The current machine learning model may be transmitted by server 115 to the plurality of user devices 105 over network 110. The current machine learning model may be broadcast, multicast, or individually single cast to each of the plurality of user devices 105. The mode of casting may be determined based on the network 110 and/or based on the connection between server 115 and each respective user device 105.

According to an implementation, the plurality of user devices 105 may be one or more of all the user devices 105 that are accessible by server 115 or a subset of all the user devices 105 that are accessible by server 115. The subset of all the user devices 105 that are accessible by server 115 may be selected based on a task-based score for each of the subset of user devices 105. A given user device 105 may be selected to receive the current machine learning model based on how strongly that user device 105 and/or the data associated with or stored on the user device 105 corresponds to the given task. For example, if the given task is to provide local technology innovation-based information to users based on the output of a trained machine learning model, then the subset of the user devices may be selected based on whether a given user device has been used to access similar information in the past.

At 204 of FIG. 2, each of the plurality of user devices 105 may, separately, train the current machine learning model using respective secure user data. Each of the plurality of user devices 105 may train the current machine learning model based on an instruction from server 115 which may be received along with the current machine learning model (e.g., as part of the same packet, consecutive packets, or temporally proximate packets). Alternatively, each of the plurality of user devices 105 may train the current machine learning model independent of any instructions from server 115. Each of the plurality of user devices 105 may, separately, train the current machine learning model such that the training by a first user device is independent from the training by a second user device (e.g., based on different secure user data).

Training the current machine learning model may include using secure user data from each respective user device as training data to train the current machine learning model. Accordingly, each user device 105 may use its distinct respective secure user data to independently train its version of the current machine learning model. Each version of the current machine learning model (i.e., at each respective user device 105) may be trained using secure user data that is local to the user device 105 or is accessible by the user device 105. For example, a given user device 105 may receive cloud data. Accordingly, the secure user data may include local user device 105 data and the cloud data.

Each user device 105 of the plurality of user devices that received the current machine learning model at 202 may train the current machine learning model to perform the given task associated with the current machine learning model. The training at 204 of FIG. 2 may result in model states (e.g., weights, layers, variables, etc.) for the current machine learning model that are generated based on each respective secure user data for each respective user device 105. For example, the model states generated by training the current machine learning model at a first device may be different than the model states generated by training the current machine learning model at a second device.

At 206 of FIG. 2, the respective model states generated by each of the plurality of user devices via the separate training at the plurality of user devices 105 may be received. The respective model states may be received at server 115 via network 110. The model states may be transmitted by each respective user device 105 when a respective user device 105 has completed the training of the current machine learning model. Alternatively, the model states may be transmitted by each respective user device 105 upon a pull request by server 115. Alternatively, partial or intermediate model states may be transmitted as they are generated (e.g., in real time).

According to an implementation, the respective model states from each of the user devices 105 may be received anonymously. Server 115 may not receive data that indicates which model states are received by which user device 105. Accordingly, the identify of a given user device 105 and/or a corresponding user may be obscured because of the respective model states being anonymous.

The current machine learning model may be updated based on a combination of the respective model states from the plurality of user devices 105. At 208 of FIG. 2, updated model states may be generated based on the combination of the respective model states. The respective model states from the plurality of user devices 105 may be normalized into a single set of updated model states that can be applied to the current machine learning model to generate the updated machine learning model. The updated model states may be generated by causing each of the plurality of user devices 105 to generate a local updated machine learning model, each local updated machine learning model having model states determined based on training the current machine learning model with the secure user data. A local updated machine model may be local to the respective device that is causing the training of the corresponding local current machine learning model.

The updated machine learning model may be generated by applying each normalized model state to each respective node. As an example, each user device 105 may provide twelve model states for twelve nodes of the current machine learning model. The model states from the plurality of user devices 105 may be normalized such that a single set of model states includes twelve normalized models states for the twelve nodes.

The normalization may include averaging the model states from the plurality of user devices 105. Alternatively, or in addition, the normalizing may include applying any other applicable function to generate the single set of model states. For example, the mode or median of the plurality of model states from multiple user devices for a first node may identified. The mode or median value for may be used as the model state for the first node. It will be understood that although an average, mode, and median are provided as examples, the normalization may be based on any formula that reduces the plurality of model states for a given node to a single model state for that node.

Accordingly, at 208 of FIG. 2, the updated machine learning model may be a version of the current machine learning model that is trained to generate outputs for a given task. The updated machine learning model may be updated based on the training performed by each of the user devices 105 and may have model states that are distinct from any or most model states received from the user devices 105 at 206.

According to an implementation, at 210, the updated machine learning model may be transmitted to a plurality of user devices 105. The updated machine learning model may be broadcast, multicast, or individually single cast to each of the plurality of user devices 105. The updated machine learning model may be transmitted to the same user devices 105 that received the machine learning model at 202 or may be transmitted to a different set of user devices 105. If transmitted to a different set of user devices 105, the different set of user devices 105 may partially overlap with the set of user devices 105 that received the current machine learning model at 202.

According to another implementation, a plurality of simulated user devices may be generated. A simulated user device may be a synthetic version of a user (e.g., with user data) or a user device (e.g., associated with a user's user data). The plurality of simulated user devices may be generated at server 115 or may be generated at another server, database, or may be provided by a third party. The simulated user devices may mimic the user devices 105 but may not correspond to any user associated user devices 105. The simulated user devices may include data, applications, relationships, etc. to mimic a simulated user. However, the simulated user devices may be disassociated with any actual users such that the data, applications, relationships, etc., of a simulated user device may not be linked to any user.

A simulated user device may have simulated device information, user data, user history, user actions, applications, accounts, account properties, etc., or a combination thereof. According to an implementation, the plurality of simulated user devices may be generated using a simulation machine learning model. The simulation machine learning model may be generated using user attributes corresponding to the plurality of user devices 105 as training data. The simulation machine learning model may be configured to output simulated user data that impersonates the user attributes and that is disassociated from user identification information. It will be understood that the simulation machine learning model may be distinct from the current machine learning model and/or the updated machine learning model.

For example, a simulation machine learning model may be generated to output simulated user devices. The simulation machine learning model may be trained using user attributes from actual user device 105. Accordingly, the training of the simulation machine learning model may include adjusting its model states to mimic a user device based on the actual attributes of actual user devices 105.

The simulated user devices may be sufficiently detailed such that an updated machine learning model may output a task result in the same or similar manner as an actual user device 105. For example, at 210 of FIG. 2, the updated machine learning model may be provided to a plurality of user devices. The plurality of user devices may each apply user attributes (e.g., user actions, history, settings, accounts, etc.) as inputs to the updated machine learning model. The updated machine learning model may provide a task-based output and a response to that output may be received. Similarly, the updated machine learning model may be provided to a plurality of simulated user devices. The plurality of simulated user devices may each apply respective simulated user attributes (e.g., simulated user actions, history, settings, accounts, etc.) as inputs to the updated machine learning model. The updated machine learning model may provide a task-based output and a simulated response to that output may be received.

Accordingly, at 210, the updated machine learning model may be provided to a plurality of simulated user devices. It will be understood that the simulated user devices may be generated or accessed at the same component (e.g., sever 115) as the updated machine learning model. It will also be understood that the simulated user devices and the user devices 105 may operate in a similar manner. Accordingly, data from a user device 105 or a simulated user device may be input to the updated machine learning model, a task-based output may be generated, and an actual or simulated response to the output may be received.

According to an implementation, at 212 of FIG. 2, an applicability feedback may be received for the updated model from each of the plurality of user devices 105 that received the updated model at 210. The applicability feedback may be an indication of a level of success (e.g., binary success, percentage of success, etc.) of the updated machine learning model for each respective user device. The applicability feedback may indicate how well the updated machine learning model fits each respective user device 105 and/or associated user for the given task associated with the model's output.

The applicability feedback may be generated by applying the updated machine learning model by each of the plurality of user devices, determining a level of success based on an output or response of the updated machine learning model (e.g., if the output or response is performed in a predetermined manner) by each of the plurality of the user devices 105, and calculating the applicability feedback based on the level of success. The level of success may be measured in any applicable manner including, but not limited to, an action being taken, an action not being taken, a threshold being met, a given result, an amount of time, an amount of a resource, or the like. The level of success may be determined by server 115 or by the one or more respective user devices 105.

According to another implementation, at 212 of FIG. 2, applicability feedback may be received for the updated model from each of the plurality of simulated user devices that received the updated model at 210. The applicability feedback may indicate how well the updated machine learning model fits each respective simulated user device and/or associated simulated user for the given task associated with the model's output.

The applicability feedback may be generated by applying the updated machine learning model by each of the plurality of simulated user devices, determining a level of success based on an output or response of the updated machine learning model by each of the plurality of the simulated user devices, and calculating the applicability feedback based on the level of success. The level of success may be determined based on an expected outcome to an actual outcome. For example, if the expected outcome is a user selection of an item, the level of success may be a binary determination of whether the expected outcome occurred (e.g., whether the user selected the item). The level of success may be a numerical value (e.g., an amount, a degree, a duration, etc.), a percentage, or a relationship. As an example, the level of success may be a numerical value determined based on a duration of time (e.g., number of minutes) or may be a percentage based on a duration of time (e.g., fifty percent of the expected time, one hundred and forty percent of the expected time, etc.).

According to an implementation, the applicability feedback from a given user device 105 or a simulated user device may be relative to the applicability feedback from one or more other user devices 105 or simulated user devices. For example, the level of success of each of a plurality of user devices 105 may be a numerical value. The server 115 may receive the numerical values from each of the plurality of user devices 105 and generate applicability feedback for each of plurality of user devices 105 based on the numerical values. As an example, the applicability feedback for a given user device 105 may be the ranking of that user device 105's level of success when compared to each of the other user devices 105 (e.g., the user devices that receive the updated model).

At 214 of FIG. 2, a plurality of user clusters may be determined. The plurality of user clusters may each include a subset of the plurality of user devices 105. The user clusters may be determined by server 115 or may be determined by a component or entity other than server 115. The user clusters may be grouped by features of the one or more user devices 105, as provided based on metadata associated with the one or more user devices 105.

The features may include any applicable attribute of a given user device 105. The features may include, for example, electronic device information (e.g., performance, capability, connectivity, connections, make, model, software, hardware, firmware, etc.), user information (e.g., demographic information, use information, action information, etc.), preference information, account information, or the like. The features may be extracted based on metadata which may be publicly available, may be obtained by a given entity, or may be provided by a user, user device. The metadata may be in any applicable format such as software code, text, pointers, packets, or the like. The metadata may be descriptive metadata, structural metadata, administrative metadata, reference metadata, statistical metadata, legal metadata, or the like. The metadata may be available to server 115 or other entity or component that determines the plurality of clusters of user devices 105.

According to an implementation, metadata used to determine the plurality of clusters may be provided to a clustering algorithm. Clusters may be based on user metadata, user device 105 metadata, user data features (e.g., inputs to a machine learning model such as a given information about a customer), and/or performance of a user with a given model (e.g., a cluster of users may be based on an accuracy range). The metadata of a cluster of the plurality of clusters may approximately match simulated user device metadata used to identify the cluster. The clustering algorithm may be a machine learning algorithm configured to cluster groups of users based on their features. According to an implementation, one or more user devices 105 may be associated with multiple clusters. According to another implementation, each user device 105 may be in a single cluster.

The user devices 105 in each cluster may be associated with the cluster based on one or more features of each of the user devices 105 overlapping. Accordingly, each user device 105 in each cluster may have the same or similar feature. According to an implementation, server 115 may identify or receive a category of features or types of features to use when determine the plurality of clusters. As a simplified example, the server 115 may determine the plurality of clusters based on the hardware storage capability of user devices 105. Accordingly, for example, a first cluster may have user devices 105 with a storage capacity of greater than 256 GB, a second cluster may have user devices with a storage capacity from 128 GB to 256 GB, and a third cluster may have user devices with a storage capacity less than 128 GB.

The cluster applicability feedback for each cluster of the plurality of clusters maybe identified. The identification may be made by server 115 that may receive the applicability feedback from each of a plurality of user devices 105. The server 115 may further apply each respective applicability feedback to the cluster that the corresponding user device 105 is associated with. The cluster applicability feedback for a given cluster may be determined by normalizing the plurality of applicability feedbacks from the plurality of user devices 105 in each cluster. The normalization may include averaging the applicability feedback from the plurality of user devices 105. Alternatively, or in addition, the normalizing may include applying any other applicable function to generate the cluster applicability feedback. For example, the mode or median of the plurality of applicability feedbacks from multiple user devices 105 for a first cluster may be identified. The mode or median value for the applicability feedbacks may be used as the cluster applicability feedback for the first cluster. It will be understood that although an average, mode, and median are provided as examples, the normalization of applicability feedbacks may be based on any formula that reduces the plurality of applicability feedbacks to a single cluster applicability feedback for a given cluster. As an example, a first cluster may include five user devices with cluster applicability feedbacks that average to be 0.7. Accordingly, the cluster applicability feedback for that cluster may be 0.7.

At 216 of FIG. 2, at least a first user cluster with a higher cluster applicability score compared to a second user cluster may be identified. It will be understood that a first user cluster and a second user cluster are disclosed herein as examples only and that cluster applicability scores for a plurality of clusters may be compared to each other to determine relatively higher and relatively lower cluster applicability scores. Clusters with a relatively higher cluster applicability score (e.g., the first cluster in this example) may be identified by comparing the cluster applicability feedback scores for a plurality of clusters. According to an implementation, a threshold number of high performing or low performing clusters may be identified. For example, the threshold may be a percentage, such as 20%, such that the clusters with the highest 20% of cluster applicability scores or lowest 20% of cluster applicability scores may be determined.

Clusters with higher cluster applicability feedback scores may be those clusters that the updated machine learning model, trained using the federated learning described herein, is most applicable for. The clusters with higher cluster applicability feedback scores may generate outputs for tasks that result in higher levels of success when compared with clusters with lower cluster applicability feedback scores. For example, an updated machine learning model may be configured to output selectable links most likely to be selected by each respective user. The clusters with higher cluster applicability feedback may include user devices 105 that, when provided the selectable links by the updated machine learning model, are more likely to receive selections of the links than clusters with lower cluster applicability feedback scores.

At 218, the user device 105 may be caused to generate additional model states. For example, server 115 may request the additional model states. The additional model states may be generated by the subset of user devices with higher cluster applicability feedback and respective lower cluster applicability feedback. At 220 of FIG. 2, the user devices 105 associated with one or more clusters may provide additional model states. Each of the plurality of user devices 105 may, separately, train the updated machine learning model using respective secure user data. Each of the plurality of user devices 105 may train the updated machine learning model based on an instruction from server 115 which may be received along with the updated machine learning model (e.g., as part of the same packet, consecutive packets, or temporally proximate packets). Alternatively, each of the plurality of user devices 105 may train the updated machine learning model independent of any instructions from server 115. Each of the plurality of user devices 105 may separately train the updated machine learning model such that the training by a first user device is independent from the training by a second user device.

Training the updated machine learning model may include using secure user data from each respective user device as training data to train the updated machine learning model. Accordingly, each user device 105 may use its distinct respective secure user data to independently train its version of the updated machine learning model. Each version of the updated machine learning model (i.e., at each respective user device 105) may be trained using secure user data that is local to the user device 105 or simulated user device or is accessible by the user device 105.

Each user device 105 that received the updated machine learning model may train the current machine learning model to perform the given task associated with the updated machine learning model. The training at 218 may result in additional model states (e.g., weights, layers, variables, etc.) for the updated machine learning model that are generated based on each respective secure user data for each respective user device 105. It will be understood that the training at 218 is different than the training at 204 such that the training at 218 is to generate additional model states using the updated machine learning model whereas the training at 204 is to generate the updated model states using the current machine learning model. The current machine learning model is initialized based on the initial model states whereas the updated machine learning model is initialized based on the updated model states. The additional model states generated by training the updated machine learning model at a first user device 105 may be different in comparison to the updated model states generated by training the updated machine learning model at a second user device 105.

The respective additional model states generated by each of the plurality of user devices 105 may be received at server 115 via network 110. The additional model states may be transmitted by each respective user device 105 when a respective user device 105 has completed the training of the updated machine learning model. Alternatively, the additional model states may be transmitted by each respective user device 105 upon a pull request by server 115. Alternatively, the additional model states may be transmitted by each respective user device 105 in real-time.

According to an implementation, the respective additional model states from each of the user devices 105 may be received anonymously. However, metadata associated with a user device 105 may indicate which cluster of the plurality of clusters the given user device 105 is associated with. Accordingly, the identity of a given user device 105 and/or a corresponding user may be obscured because of the respective additional model states being anonymous.

At 222, the updated machine learning model may be updated to generate a cluster-based machine learning model by applying a positive bias to the additional model states from one or more clusters with lower cluster applicability feedback scores when compared to clusters with higher cluster applicability feedback scores. The cluster-based machine learning model may be generated further by applying a negative bias to the additional model states from one or more clusters with higher cluster applicability feedback scores when compared to clusters with lower cluster applicability feedback scores. As a simplified example, a first cluster may have a higher cluster applicability feedback score than a second cluster. Accordingly, updated model weights from the first cluster may be negatively biased such that those updated model weights are deemphasized when training the updated machine learning model to generate the cluster-based machine learning model. Updated model weights from the second cluster may be positively biased such that those updated model weights are emphasized when training the updated machine learning model to generate the cluster-based machine learning model.

According to an implementation, applying the negative bias includes generating the cluster-based machine learning model by training the updated machine learning model based on the updated model states from one or more clusters with relatively lower cluster applicability feedback, without training the updated machine learning model based on the updated model states from one or more clusters with relatively higher cluster applicability feedback. According to this implementation, only the clusters with relatively lower cluster applicability feedbacks may be used to update the updated machine learning model to generate the cluster-based machine learning model. By only using the clusters with the lower cluster applicability feedbacks, the training from those clusters is positively biased when generating the cluster-based machine learning model.

The number of clusters that are used to apply a positive and/or negative feedback (i.e., the number of clusters considered as having a lower cluster applicability feedback or higher cluster applicability feedback) may be predetermined (e.g., a number, a percentage, an applicability feedback cutoff, etc.) or may be determined dynamically. A predetermined number of clusters may be determined at server 115 or may be provided (e.g., by a user). The predetermined number of clusters may be determined based on historical data or may be task based. For example, the number of predetermined clusters that have the lowest cluster applicability scores may be determined based on the type of output provided by the cluster-based machine learning model. For a first model, for example, the number of clusters that a positive bias is applied to may be twelve, but for a second model, the number may be fifteen.

The number of clusters that are used to apply a positive and/or negative feedback may be dynamically determined based on the variance or other properties of the distribution of applicability feedback. The properties may include any applicable distribution-based properties such as standard deviation, coefficient of variation, etc. For example, if 80% of the clusters have cluster applicability feedback above a minimum threshold and 20% of the clusters have cluster applicability feedback below the threshold, then the additional states provided by the clusters below the threshold may be positively biased. The additional states provided by the clusters above the threshold may be negatively biased or may not be applied when generating the cluster-based machine learning model. According to another example, the cluster applicability feedbacks may be mapped to a distribution curve. The additional states provided by the top (e.g., highest 20%) of the clusters may be negatively biased or may not be used when training the cluster-based machine learning model. The additional states provided by the middle (e.g., 80%) of the clusters may not be positively or negatively biased or may not be used when training the cluster-based machine learning model. The additional states provided by the bottom (e.g., lowest 20%) of the clusters may be positively biased such that those additional states are most emphasized in generating the cluster-based machine learning model.

Figure 3:
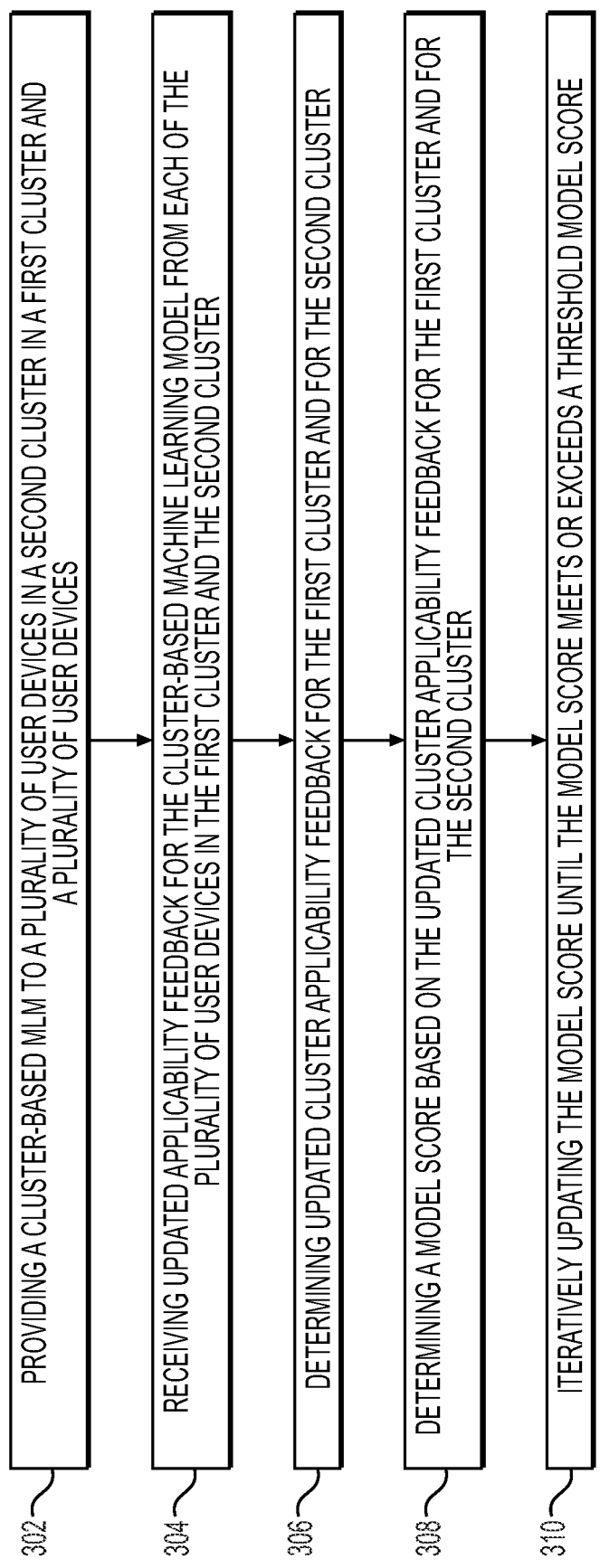
FIG. 3 depicts another flowchart of an exemplary method of training a federated machine learning model using cluster-based feedback, according to one or more embodiments.

FIG. 3 shows a flowchart for iteratively improving the cluster-based machine learning model generated at 222 of FIG. 2. The cluster-based machine learning model may be iteratively improved until the model score of the cluster-based machine learning model reaches a threshold model score. The model score of a cluster-based machine learning model may be the overall score for the model determined based on a plurality of the cluster applicability scores. Alternatively or in addition, the model score of a cluster-based machine learning model may be a loss penalty. The loss penalty may be a value that indicates how bad the model's prediction is for a given example. For example, if the model's prediction is perfect, the loss may be zero. According to this implementation, a model score may be updated until the loss stabilizes. The model score may be determined based, at least in part, on the deviation between the plurality of cluster applicability scores. For example, the model score may be based on a standard deviation of cluster applicability feedbacks such that a higher standard deviation may result in a lower model score and a lower standard deviation may result in a higher model score. By iteratively improving the cluster-based machine learning model generated at 220, a lower model score may be improved by positively biasing additional model states from clusters with lower cluster applicability feedbacks.

At 302 of FIG. 3, the cluster-based machine learning model generated at 222 of FIG. 2 may be provided to a plurality of user devices 105 that correspond to respective clusters. Each of the plurality of user devices 105 may apply the cluster-based machine learning model and may determine updated applicability feedbacks based on the output of the cluster-based machine learning model. The applicability feedback may be an indication of a level of success (e.g., binary success, percentage of success, etc.) of the cluster-based machine learning model for each respective user device. The applicability feedback may indicate how well the cluster-based machine learning model fits each respective user device 105 and/or associated user for the given task associated with the model's output.

The updated applicability feedback may be generated by applying the cluster-based machine learning model by each of the plurality of user devices 105, determining a level of success based on an output or response of the cluster-based machine learning model (e.g., if the output or response is performed in a predetermined manner) by each of the plurality of the user devices 105, and calculating the updated applicability feedback based on the level of success. The level of success may be measured in any applicable manner, as discussed herein.

At 304, the updated applicability feedback for the cluster-based machine learning model may be received (e.g., at server 115) from each of the plurality of user devices 105 that correspond to respective clusters. At 306, updated cluster applicability feedback for each of the plurality of clusters may be determined based on the updated applicability feedback from each of the plurality of user devices 105. As discussed herein, the updated applicability feedback of the user devices 105 in a given cluster may be used to determine the updated cluster applicability feedback for that given cluster.

At 308, a model score may be determined for the cluster-based machine learning model, as disclosed herein. The model score may be based on the updated cluster applicability feedback for each or a subset of the plurality of clusters (e.g., based on clusters with a lower cluster applicability feedback or updated cluster applicability feedback).

A determination may be made whether the model score is below a threshold model score and, at 310, the cluster-based feedback model may be iteratively updated until the model score meets or exceeds the threshold model score. If the model score is above the threshold model score, then no further iterations may be performed at least until a later time. If the model score is below the threshold model score, then the iterative process to further train the cluster-based machine learning model may continue. The iterative process may include causing user devices 105 in respective clusters to generate additional model states by further training the cluster-based machine learning model, based on the techniques disclosed herein. The additional model states may be received at server 115 and may be associated with their respective clusters. The cluster-based machine learning model may be updated by applying a positive bias to the additional model states from clusters having a lower cluster applicability feedback and a null bias or negative bias to the additional model states from the clusters having a higher or above threshold cluster applicability feedback. This process of FIG. 3 may iteratively continue until the model score meets or exceeds the threshold model score.

Figure 4A:
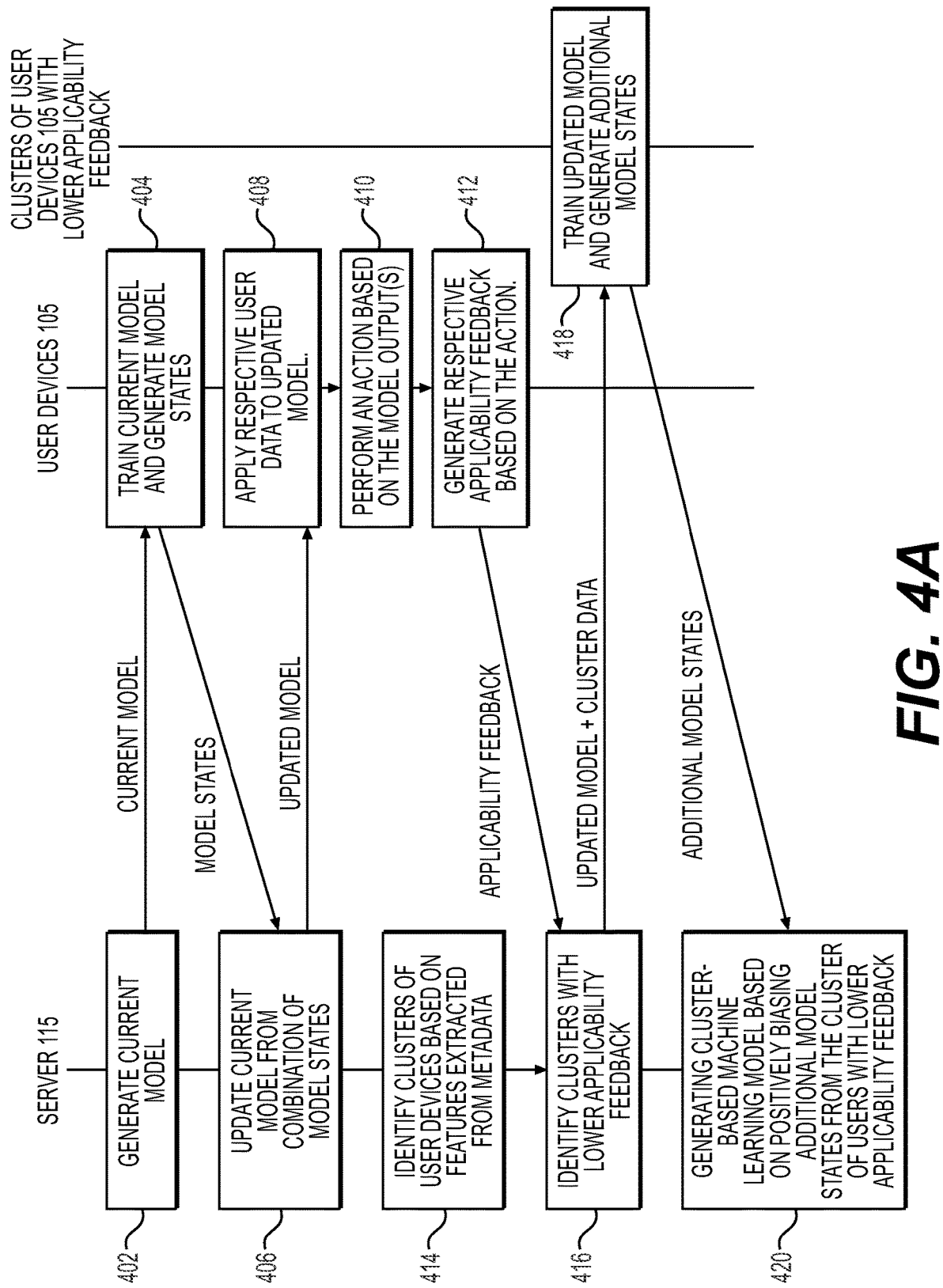
FIG. 4A depicts a flow diagram for training a federated machine learning model using cluster-based feedback using user devices, according to one or more embodiments.

FIG. 4A depicts a flow diagram for optimizing a federated machine learning model using cluster-based feedback using user devices. A current machine learning model may be generated at 402. The current machine learning model may be generated at server 115 and may be provided to user devices 105. At 404, the current machine learning model may be locally trained at each of the user devices 105 to generate respective model states at each of the plurality of user devices 105. The model states may be provided to server 115 and the server 115 may update the current model from a combination of the model states (the combination referred to as updated model states) received from the plurality of user device 105, at 406. For example, server 115 may apply a function to normalize the plurality of sets of models states received from the respective plurality of user devices, such that a single set of updated model states is generated. That single set of updated model states may be applied to the current machine learning model, resulting in an updated machine learning model.

The updated machine learning model may be provided to each of the plurality of user devices 105 and, at 408, each of the plurality of user devices may apply respective user data as inputs to the updated machine learning model. According to an implementation, at 410, the user devices 105 may perform an action based on the output of the model. The user action may be an interaction, a selection, an activity, a purchase, an input, or the like. Based on at least one of the output of the updated machine learning model at 408 and/or the action at 410, a respective applicability feedback may be generated at 412. The respective applicability feedback may be generated by each of the plurality of user devices 105 and, as described herein, may correspond to the level of success of the updated machine learning model as applicable to each respective user device 105. The applicability feedback from each user device 105 may be provided to server 115.

At 414, server 115 or one or more other entities may identify clusters of user devices 105 based on features extracted from metadata, as disclosed herein. Each user device 105 may correspond to at least one cluster. The clusters identified at 414 may be identified by a clustering machine learning model which may be trained to identify clusters based on user features where metadata is provided as input to the model. The clustering machine learning model may be trained and may operate in accordance with the machine learning techniques disclosed herein. At 416, clusters with lower cluster applicability feedback may be identified. A cluster applicability feedback may be based on the applicability feedback of the user devices 105 in a given cluster, as disclosed herein. Based on the clusters identified at 416, the clusters of user devices 105 with lower applicability feedback may be provided the updated machine learning model. At 418, the clusters with lower applicability feedback may train the updated machine learning model and may generate additional model states. It will be understood that although FIG. 4A shows that clusters of user devices 105 train the updated model to generate the additional model states, as disclosed herein, user devices 105 in one or more other clusters (e.g., clusters other than the clusters with the lower applicability feedback) may also provide additional model states. However, a positive bias may be applied to the additional model states generated at the user devices 105 with lower applicability feedbacks. At 420, the updated machine learning model may be updated based on the additional model states to generate a cluster-based machine learning model. The additional model states from user devices 105 with lower cluster applicability feedback may be positively biased (e.g., by only applying the additional states from the user devices 105 with lower cluster applicability feedbacks or by positively biasing those additional model states relative to higher cluster applicability feedback clusters). Accordingly, the cluster-based machine learning model may be trained using federated learning and may be optimized based on cluster feedback to provide outputs that are normalized across a variety of clusters and corresponding user features.

Figure 4B:
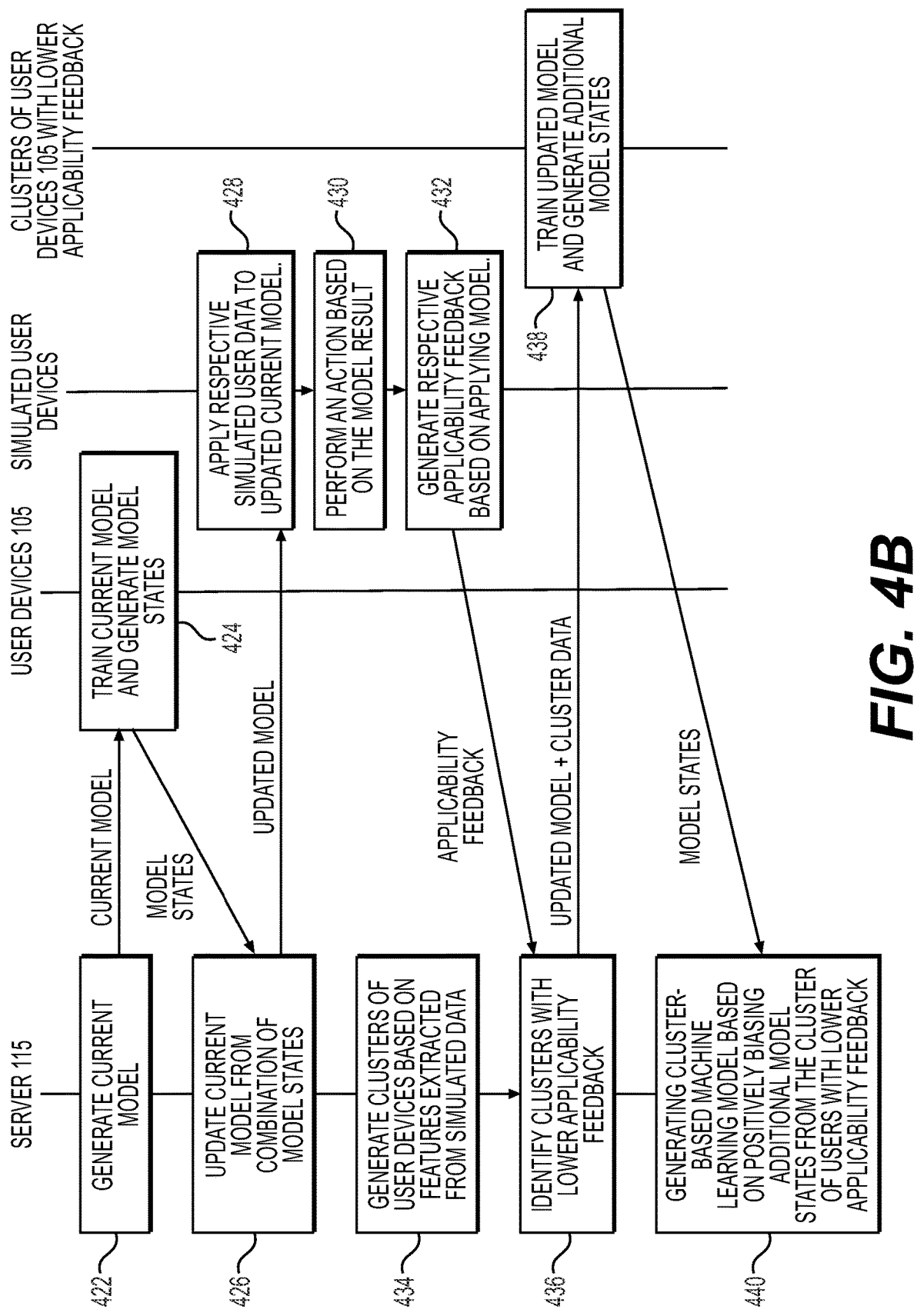
FIG. 4B depicts a flow diagram for training a federated machine learning model using cluster-based feedback using simulated user devices, according to one or more embodiments.

FIG. 4B depicts a flow diagram for optimizing a federated machine learning model using cluster-based feedback using simulated user devices. A current machine learning model may be generated at 422. The current machine learning model may be generated at server 115 and may be provided to user devices 105. At 424, the current machine learning model may be locally trained at each of the user devices 105 to generate respective model states at each of the plurality of user devices 105. The model states may be provided to server 115 and the server 115 may update the current model from a combination of the model states (the combination referred to as updated model states) received from the plurality of user devices 105, at 426. For example, server 115 may apply a function to normalize the plurality of sets of models states received from the respective plurality of user devices, such that a single set of updated model states is generated. That single set of updated model states may be applied to the current machine learning model, resulting in an updated machine learning model.

The updated machine learning model may be provided to each of a plurality of simulated user devices and, at 428, each of the plurality of simulated user devices may apply respective simulated user data as inputs to the updated machine learning model. According to an implementation, at 430, the simulated user devices may perform a simulated action based on the output of the model. The simulated action may be an interaction, a selection, an activity, a purchase, an input, or the like. Based on at least one of the output of the updated machine learning model at 428 and/or the action at 430, a respective applicability feedback may be generated at 432. The respective applicability feedback may be generated by each of the plurality of simulated user devices and, as described herein, may correspond to the level of success of the updated machine learning model as applicable to each respective simulated user device. The applicability feedback from each simulated user device may be provided to server 115.

At 434, server 115 or one or more other entities may identify clusters of user devices based on features extracted from metadata, as disclosed herein. Each user device may correspond to at least one cluster. The clusters identified at 434 may be identified by a clustering machine learning model, as disclosed herein. At 436, clusters with lower cluster applicability feedback may be identified. A cluster applicability feedback may be based on the applicability feedback of the user devices in a given cluster, as disclosed herein. Based on the clusters identified at 436, the clusters of user devices with lower applicability feedback may be provided the updated machine learning model. At 438, the clusters with lower applicability feedback may train the updated machine learning model and may generate additional model states. It will be understood that although FIG. 4B shows that clusters of user devices train the updated model to generate the additional model states, as disclosed herein, user devices in one or more other clusters (e.g., clusters other than the clusters with the lower applicability feedback) may also provide additional model states or noise that mimics additional model states. However, a positive bias may be applied to the additional model states generated at the user devices with lower applicability feedbacks. At 440, the updated machine learning model may be updated based on the additional model states to generate a cluster-based machine learning model. The additional model states from user devices with lower cluster applicability feedback may be positively biased (e.g., by only applying the additional states from the user devices 105 with lower cluster applicability feedbacks or by positively biasing those additional model states relative to higher cluster applicability feedback clusters). Accordingly, the cluster-based machine learning model may be trained using federated learning and may be optimized based on cluster feedback to provide outputs that are normalized across a variety of clusters and corresponding user features.

It will be understood that one or more techniques disclosed herein in reference to FIG. 4A and FIG. 4B may be combined. For example, an updated machine learning model may be provided to both user device 105 and simulated users.

The flow escribed in FIGS. 4A and 4B may allow for increased security of for users based on user data on user device 105 remaining on the user device. Additionally, a machine learning model is trained across clusters of users for improved performance across the clusters. The techniques also reduce time and resources required to train a machine learning model by only having a subset of user devices with lower performance to continue training the model.

According to implementations of the disclosed subject matter, a ruleset may be generated based on identifying clusters with lower applicability feedback at 416 of FIG. 4A and/or 436 of FIG. 4B. The ruleset may be provide to user devices 105 after step 416 and/or 436 and may be provided along with an updated model. User devices 105 may provide an output (e.g., additional model states) based on the ruleset. The rules set may include cluster based data that solicits the additional model states from user devices 105 if they correspond to a given cluster (e.g., a cluster with lower applicability feedback). For example, the rule set may instruct user devices 105 to provide additional model states if a given user device belongs to a lower applicability feedback cluster). As an example, if the lower applicability feedback cluster includes devices in a given geographical area, then the ruleset may instruct user devices 105 to provide additional model states if the user device's geo-positioning data corresponds to that geographical area. Accordingly, though a plurality of user devices 105 receive an updated model, only the user devices 105 that correspond to clusters with lower applicability feedback may provide additional model states.

Alternatively, or in addition, the ruleset may instruct user devices 105 that are not part of a cluster with lower applicability feedback to weight additional model states. For example, a user device in a cluster with a high applicability feedback may weight its additional model states lower and a user device in a cluster with a low applicability feedback may weight its additional model states higher. Accordingly, though a plurality of user devices 105 receive an updated model, the user devices that correspond to clusters with lower applicability feedback may provide additional model states that are weighted higher than those provided from user devices with high applicability feedback.

Alternatively, or in addition, the ruleset may instruct user devices 105 that are not part of a cluster with lower applicability feedback to transmit noise. For example, a user device in a cluster with a high applicability feedback may respond with noise and a user device in a cluster with a low applicability feedback may transmit additional model states. Accordingly, though a plurality of user devices 105 receive an updated model, the user devices that correspond to clusters with lower applicability feedback may provide additional model states that are applied.

Applying the ruleset to provide additional model states by user devices 105 in a cluster with low applicability feedback, providing weighted additional model states, and/or providing noise may increase security. For example, if weighted additional model states or noise are intercepted by a third party, the third party may not be able to distinguish between two user devices 105. Accordingly, the third party may not be able to determine if a given user device 105 corresponds to a cluster with lower applicability feedback.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as the processes illustrated in FIGS. 2-4B, may be performed by one or more processors of a computer system, such as any of the systems or devices in the exemplary system 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 5:
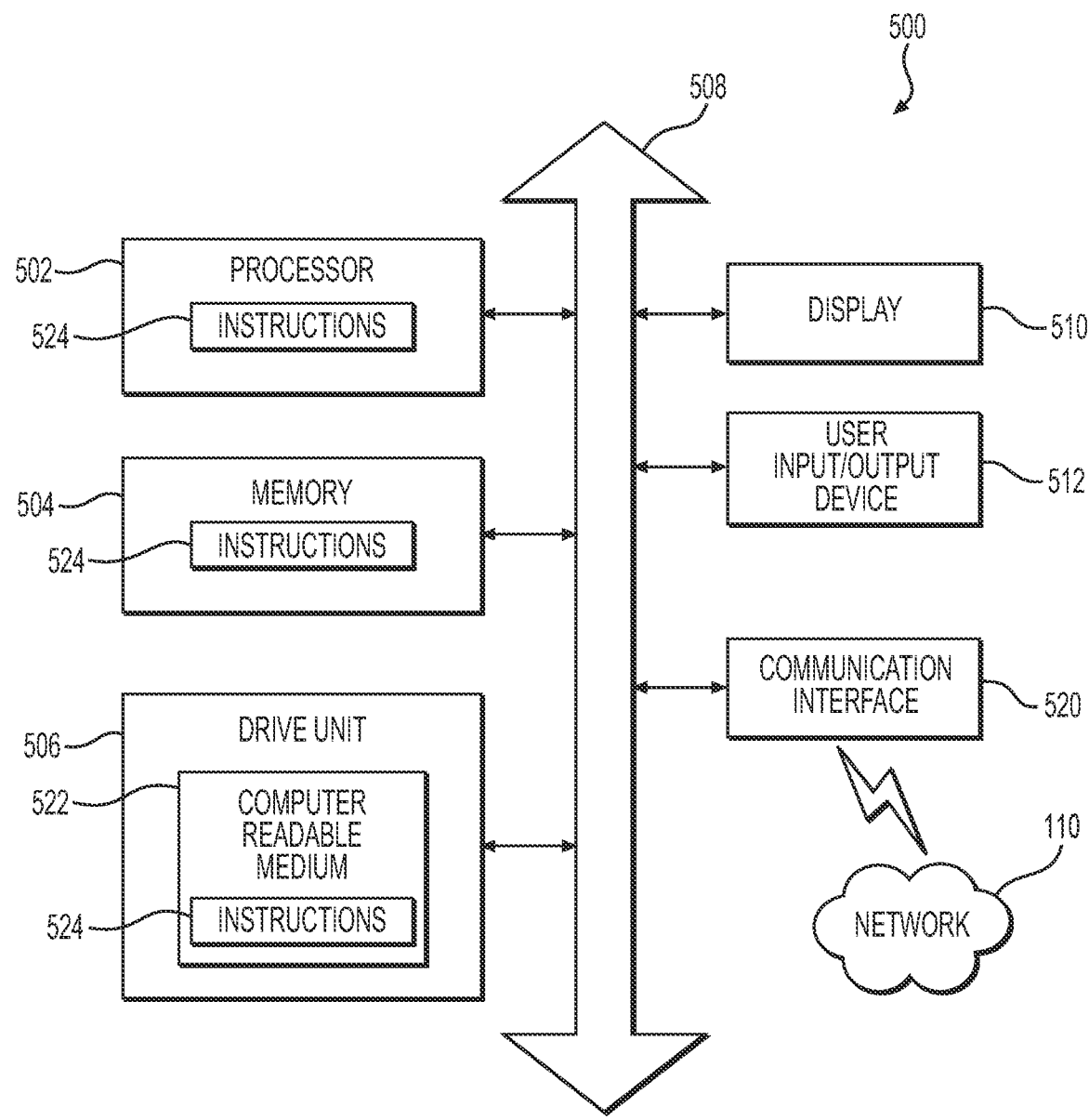
FIG. 5 depicts an example of a computing device, according to one or more embodiments.

FIG. 5 is a simplified functional block diagram of a computer 500 that may be configured as a device for executing the methods of FIGS. 2-4B, according to exemplary embodiments of the present disclosure. For example, the computer 500 may be configured as a system according to exemplary embodiments of this disclosure. In various embodiments, any of the systems herein may be a computer 500 including, for example, a data communication interface 520 for packet data communication. The computer 500 also may include a central processing unit ("CPU") 502, in the form of one or more processors, for executing program instructions. The computer 500 may include an internal communication bus 508, and a storage unit 506 (such as ROM, HDD, SDD, etc.) that may store data on a computer readable medium 522, although the computer 500 may receive programming and data via network communications. The computer 500 may also have a memory 504 (such as RAM) storing instructions 524 for executing techniques presented herein, although the instructions 524 may be stored temporarily or permanently within other modules of computer 500 (e.g., processor 502 and/or computer readable medium 522). The computer 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for generating a cluster-based machine learning model based on federated learning with cluster feedback, the method comprising:
   providing a current machine learning model to a plurality of user devices, the user devices each comprising respective secure user data;
   causing each of the plurality of user devices to separately train the current machine learning model using the respective secure user data;
   receiving respective model states generated by each of the plurality of user devices via the separate training;
   generating updated model states based on a combination of the respective model states from the plurality of user devices;
   causing the plurality of user devices or a plurality of simulated user devices generated based on the plurality of user devices to each obtain a respective instance of an updated machine learning model based on the updated model states;
   receiving an applicability feedback for the updated machine learning model for each of the plurality of user devices or each of the plurality of simulated user devices;
   determining a plurality of user clusters, each user cluster of the plurality of user clusters including a subset of the plurality of user devices;
   identifying a first user cluster and a second user cluster, the first user cluster including a first subset of the plurality of user devices and having a higher cluster applicability feedback than the second user cluster including a second subset of the plurality of user devices;
   causing the first subset and the second subset of the plurality of user devices or simulated user devices to generate additional model states;
   receiving the additional model states from the first cluster and the second cluster; and
   updating the updated machine learning model to generate the cluster-based machine learning model by applying a positive bias to the additional model states from the second cluster and applying a negative bias to the additional model states from the first cluster.

2. The method of claim 1, wherein:
   causing each of the plurality of user devices to separately train the current machine learning model using the respective secure user data includes causing each respective user device to apply the secure user data as training data to train the current machine learning model; and
   generating the updated model states includes causing each of the plurality of user devices to generate a local updated machine learning model, each local updated machine learning model having model states determined based on training the current machine learning model with the secure user data.

3. The method of claim 1, wherein the applicability feedback for the updated machine learning model for each of the plurality of user devices is provided by:

causing each of the plurality of user device to apply the updated machine learning model;

receiving, from each of the plurality of user devices, an indication of a level of success of an outcome of applying the updated machine learning model; and calculating the applicability feedback based on the level of success.

4. The method of claim 1, wherein the applicability feedback for the updated current model for each of the plurality of simulated user devices corresponding to the plurality of user devices is provided by:

generating the plurality of simulated user devices that are based on the plurality of user devices and disassociated from the plurality of user devices;

applying the updated machine learning model by each of the plurality of simulated user devices;

receiving, from each of the plurality of simulated user devices, an indication of a level of success of an outcome of applying the updated machine learning model; and calculating the applicability feedback based on the level of success.

5. The method of claim 4, wherein the plurality of simulated user devices are generated using a simulation machine learning model, the simulation machine learning model is trained using user attributes corresponding to the plurality of user devices as training data, the simulation machine learning model configured to output simulated user data that has simulated user attributes that correspond to the user attributes and that is disassociated from user identification information.

6. The method of claim 1, wherein generating the updated machine learning model based on the respective model states from the plurality of user devices includes:

normalizing the respective model states to generate updated model states; and updating the current machine learning model with the updated model states to generate the updated machine learning model.

7. The method of claim 1, wherein the current machine learning model is at least partially initialized with predetermined states.

8. The method of claim 1, wherein the current machine learning model is at least partially initialized with one of no states, null states, or singular states.

9. The method of claim 1, wherein the plurality of clusters are identified based on user metadata associated with each of the plurality of user devices.

10. The method of claim 9, wherein the user metadata for a cluster of the plurality of clusters approximately matches simulated user device metadata.

11. The method of claim 1, wherein applying the positive bias comprises training the updated machine learning model with higher weights applied to the additional model states from the second cluster in comparison to the first cluster.

12. The method of claim 1, wherein applying the negative bias comprises training the updated machine learning model with lower weights applied to the additional model states from the first cluster in comparison to the second cluster.

13. The method of claim 1, wherein applying the negative bias comprises generating the cluster-based machine learning model by training the updated machine learning model based on the additional model states from the second cluster without training the updated machine learning model based on the additional model states from the first cluster.

14. A system comprising:

a data storage device storing processor-readable instructions; and a processor operatively connected to the data storage device and configured to execute the instructions to perform operations that include:

providing a current machine learning model to a plurality of user devices, the user devices each comprising respective secure user data;

causing each of the plurality of user devices to separately train the current machine learning model using the respective secure user data;

receiving respective model states generated by each of the plurality of user devices via the separate training;

generating updated model states based on a combination of the respective model states from the plurality of user devices;

causing the plurality of user devices or a plurality of simulated user devices generated based on the plurality of user devices to each obtain a respective instance of an updated machine learning model based on the updated model states;

receiving an applicability feedback for the updated machine learning model for each of the plurality of user devices or each of the plurality of simulated user devices;

determining a plurality of user clusters, each user cluster of the plurality of user clusters including a subset of the plurality of user devices;

identifying a first user cluster and a second user cluster, the first user cluster including a first subset of the plurality of user devices and having a higher cluster applicability feedback than the second user cluster including a second subset of the plurality of user devices;

causing the first subset and the second subset of the plurality of user devices to generate additional model states;

receiving the additional model states from the first cluster and the second cluster; and updating the updated machine learning model to generate the cluster-based machine learning model by applying a positive bias to the additional model states from the second cluster and applying a negative bias to the additional model states from the first cluster.

15. The system of claim 14, wherein the model states are generated by:

applying, by each respective user device, the secure user data as training data to train the current machine learning model; and generating a local updated machine learning model at each of the plurality of user devices, each local updated machine learning model having model states determined based on training the current machine learning model with the secure user data.

16. The system of claim 14, wherein the applicability feedback for the updated machine learning model for each of the plurality of user devices is provided by:

applying the updated machine learning model by each of the plurality of user devices;

determining a level of success based on an output of the updated machine learning model performing in a predetermined manner, by each of the plurality of user devices; and calculating the applicability feedback based on the level of success.

17. The system of claim 14, wherein the applicability feedback for the trained machine learning model for each of the plurality of simulated user devices corresponding to the plurality of user devices is provided by:
   generating the plurality of simulated user devices that are based on the plurality of user devices and disassociated from the plurality of user devices;
   applying the updated machine learning model by each of the plurality of simulated user devices;
   determining a level of success based on an output of the updated machine learning model performing in a predetermined manner, by each of the plurality of simulated user devices; and
   calculating the applicability feedback based on the level of success.

18. The system of claim 17, wherein the plurality of simulated user devices are generated using a simulation machine learning model, the simulation machine learning model is trained using user attributes corresponding to the plurality of user devices as training data, the simulation machine learning model configured to output simulated user data that has simulated user attributes that correspond to the user attributes and that is disassociated from user identification information.

19. The system of claim 17, wherein generating the updated machine learning model based on the respective model states from the plurality of user devices includes:
   normalizing the respective model states to generate updated model states; and
   updating the current machine learning model with the updated model states to generate the updated machine learning model.

20. A method for generating a machine learning model based on federated learning with cluster feedback, the method comprising:
   generating a current machine learning model configured to output a task output;
   providing the current machine learning model to a plurality of user devices, the user devices each comprising secure user data;
   causing each of the plurality of user devices to separately train the current machine learning model using the respective secure user data;
   receiving respective model states generated by each of the plurality of user devices via the separate training;
   normalizing the model states from each of the plurality of user devices to generate updated model states;
   updating the current machine learning model with the updated model states to generate an updated machine learning model;
   providing the updated machine learning model to the plurality of user devices or a plurality of simulated user devices generated based on the plurality of user devices;
   receiving an applicability feedback for the updated machine learning model from each of the plurality of user devices or each of the plurality of simulated user devices;
   determining a plurality of user clusters, each user cluster of the plurality of user clusters including a subset of the plurality of user devices, wherein the plurality of clusters are determined based on user metadata associated with each of the plurality of user devices;
   identifying a first user cluster and a second user cluster, the first user cluster comprising a first subset of the plurality of user devices and having a higher cluster applicability feedback than the second user cluster comprising a second subset of the plurality of user devices;
   causing the first subset and the second subset of the plurality of user devices to generate additional model states by further training the updated machine learning model;
   receiving the additional model states from the first cluster and the second cluster; and
   updating the updated machine learning model to generate the cluster-based machine learning model by applying a positive bias to the additional model states from the second cluster and applying a negative bias to the additional model states from the first cluster; and
   iteratively performing steps a-e until a model score meets or exceeds a threshold model score, steps a-e comprising:
   a) providing the cluster-based machine learning model to plurality of user devices in the first cluster and the plurality of user devices in the second cluster;
   b) receiving updated applicability feedback for the cluster-based machine learning model from each of the plurality of user devices in the first cluster and the second cluster;
   c) determining updated cluster applicability feedback for the first cluster and for the second cluster based on the updated applicability feedback from the plurality of user devices;
   d) determining a model score based on the updated cluster applicability feedback for the first cluster and for the second cluster; and
   e) when the model score is below the threshold model score:
      causing the first subset and the second subset of the plurality of user devices to generate additional model states by further training the cluster-based machine learning model;
      receiving the additional model states from the first cluster and the second cluster; and
      updating the cluster-based machine learning model by applying a positive bias to the additional model states from the second cluster and applying a negative bias to the additional model states from the first cluster.

* * * * *